(Model.)

N. W. CRANDALL & G. W. JOPSON.
POCKET KNIFE.

No. 338,251. Patented Mar. 23, 1886.

Witnesses
Saml R. Turner
A. Parker

Inventor
Nathan W. Crandall
George W. Jopson
By R. S. & A. P. Lacey Attys

UNITED STATES PATENT OFFICE.

NATHAN W. CRANDALL AND GEORGE W. JOPSON, OF MERIDEN, CONN.

POCKET-KNIFE.

SPECIFICATION forming part of Letters Patent No. 338,251, dated March 23, 1886.

Application filed May 4, 1885. Serial No. 164,282. (Model.)

*To all whom it may concern:*

Be it known that we, NATHAN W. CRANDALL and GEORGE W. JOPSON, citizens of the United States, residing at Meriden, in the county of New Haven and State of Connecticut, have invented certain new and useful Improvements in Knives; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in knives or implements having a handle and a pivoted blade, hook, or other device which may be closed into the handle or opened for use, as desired. It is particularly designed for pocket-knives, but is applicable to any household article pivoted to and shutting into its handle.

Figure 1:
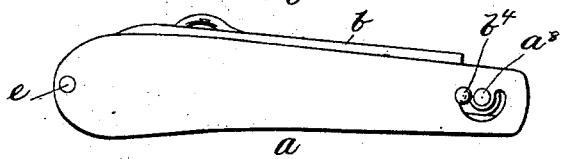
Figure 2:
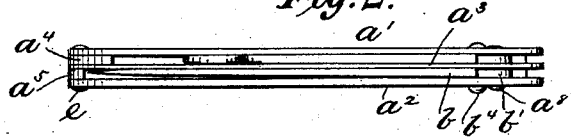
Figure 3:
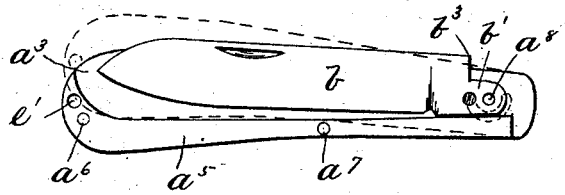
Figure 4:
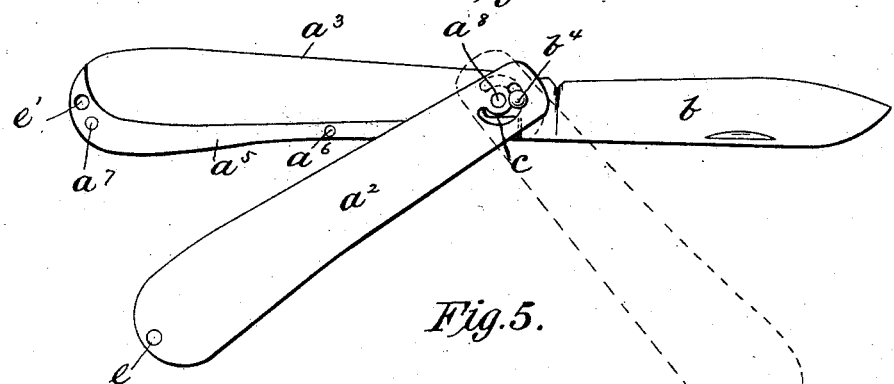
Figure 5:

In the drawings, Figure 1 is a side view, and Fig. 2 is a top edge view, of a two-blade knife. Fig. 3 is a view having the scale removed and the blade closed, the scale being shown in dotted lines just before it is pressed down to its fastening. Fig. 4 is a side view having the scale removed, the blade open, and showing in dotted lines different positions of the scale and a blade in the act of opening and locking. Fig. 5 is a detail showing an end view of the scale provided with the catch-pin, and a side view of a portion of the knife with the scale removed, showing the socket for the catch-pin.

$a$ is the frame of an ordinary two-blade pocket-knife employed to illustrate the application of our invention. Instead of one of the blades, we show a button-hook. This frame has the ordinary scales, $a'$ $a^2$, and the middle partition, $a^3$. The back-springs $a^4$ $a^5$, held in place by the rivets $a^6$ $a^7$ and the pivot-pin $a^8$, are of ordinary construction and arrangement.

We would not have it understood that our invention is applicable only to two-blade knives. It can be equally as well applied to a single-blade knife.

We shall first describe the invention in its application to a single-blade knife in which one of the scales is immovable. The pivot-pin is secured by one end rigidly to the immovable scale. Its other end passes through and is so riveted as to hold the movable scale in place and permit it to be turned thereon. The tang $b'$ of the blade $b$ is also placed on the pivot-pin, so that its rear shoulder, $b^3$, will turn against the end of the back-spring in the well-known manner. Through the movable scale an approximately semicircular slot, $c$, is cut, concentric with the pivot-pin, and a guide-pin, $b^4$, fixed to the blade projects through the said slot. Ordinarily the center of the pin $b^4$ would be arranged on a line drawn from the center of the pivot-pin $a^8$ to the point of the blade. Such arrangement draws the point of the blade within the handle when the said blade is shut, and when open holds it with its shoulder against the end of the back-spring. In this arrangement it will be seen we bring the knife into proper position and take the strain off the pivot-pin just as such strain is relieved in the ordinary knife.

In addition to the foregoing we obtain another valuable result by a construction which we will now describe. The slot $c$ is approximately semicircular. The guide-pin is so arranged relatively to the blade and slot that the movable scale will be stopped by the guide-pin before it reaches a direct coincidence with the fixed scale or partition. The movable scale must then be pressed forcibly till it comes to its proper position alongside the fixed scale. The back-spring yields under the pressure exerted on the guide-pin. When the scale is locked in place, the blade will be locked rigidly against any possible movement. In the outer end of the movable scale we fix a catch-pin, $e$, which engages in a hole, $e'$.

This invention is applicable to a knife having two blades, as that shown in the drawings. The pivot-pin is fixed rigidly in the middle partition. Two back-springs are riveted to the partition in the ordinary manner, and both scales are slotted and movable in the same manner as the one hereinbefore described.

We are aware that it is not new to have a movable scale provided with a semicircular slot concentric with the pivot-pin and engaging on a pin projected from the side of the blade, such construction being shown in the patent to Perry, No. 36,620. We do not claim, broadly, such construction.

Having thus described our invention, what we claim, and desire to secure by Letters Patent, is—

1. The combination, substantially as hereinbefore described, of the fixed scale or partition, the back-spring, the blade having a guide-pin on its side and a shoulder to engage the back-spring, the movable scale having a semicircular slot concentric with the pivot-pin of the blade, and the pivot-pin, all arranged and operating substantially as set forth.

2. In a knife, the combination, with a movable scale having an approximately semicircular slot concentric with the pivot-pin, the blade, and the back-spring, of the guide-pin projected from the side of the blade through the slot and arranged to stop the scale before the latter reaches its normal position on the handle, and a catch-pin projecting from the outer end of the scale to enter a corresponding opening in the handle, substantially as and for the purpose set forth.

In testimony whereof we affix our signatures in presence of two witnesses.

NATHAN W. CRANDALL.
GEORGE W. JOPSON.

Witnesses:
HENRY DRYHURST,
WILLIS I. FENN.